United States Patent [19]

Burgdorf et al.

[11] Patent Number: 5,295,739
[45] Date of Patent: Mar. 22, 1994

[54] BRAKE PRESSURE CONTROL APPARATUS

[75] Inventors: Jochen Burgdorf, Offenbach-Rumpenheim; Helmut Steffes, Hattersheim; Peter Volz, Darmstadt; Erhard Beck, Weilburg; Dalibor Zaviska, Frankfurt am Main, all of Fed. Rep. of Germany

[73] Assignee: Alfred Teves GmbH, Frankfurt am Main, Fed. Rep. of Germany

[21] Appl. No.: 964,626

[22] Filed: Oct. 22, 1992

Related U.S. Application Data

[63] Continuation-in-part of Ser. No. 705,221, May 24, 1991, Pat. No. 5,176,432.

[30] Foreign Application Priority Data

May 25, 1990 [DE] Fed. Rep. of Germany ....... 4016744

[51] Int. Cl.$^5$ ................................................. B60T 8/32
[52] U.S. Cl. ................................. 303/113.1; 303/9.72; 303/116.1; 303/119.1
[58] Field of Search ...................... 303/113.1, 10, 9.62, 303/9.75, 113.5, 116.1, 119.1, 900, 901, 113.2, 113.3, 115.5, 115.4, 9.73, 9.74, 117.1, 119.2, 116.4, 9.72; 188/181 A, 181 C, 349

[56] References Cited

U.S. PATENT DOCUMENTS 5,176,432 1/1993 Burgdof et al. ................. 303/116.1

*Primary Examiner*—Douglas C. Butler
*Attorney, Agent, or Firm*—Robert P. Seitter; J. Gordon Lewis

[57] ABSTRACT

A brake pressure control apparatus for automotive vehicles with an anti-locking control system (ABS) and/or with a traction slip control system (TSS) is presented. In the inlet line to the wheel cylinder an inlet valve is provided which affords a change-over from an orifice function into a flow limiting valve function at a predetermined wheel cylinder pressure. Flow is initially through an orifice (6) in a control slide valve piston (20), held in its initial position by a prestressing spring (23) acting through an auxiliary piston in engagement with control slide valve piston (20). An increase in pressure in the wheel cylinder (13), also exerted in the wheel cylinder pressure chamber (9), to a predetermined level, causes the auxiliary piston (27) to disengage from the control slide valve piston (20), preventing the force of the prestressing spring (23) from acting on the control slide valve piston (20). As a result, the control slide valve piston (20) is free to reach an equilibrium position corresponding to the magnitude of the remaining forces acting upon the piston (20). A control edge (33) on the piston (20) establishes a flow cross-sectional area (34) which, upon the filling of the wheel cylinder (13), leads to a constant nominal flow rate within the lines (19, 11, 12) to the wheel cylinder (13). The invention is distinguished in that precisely defined pressure gradients, a better adaptation to the volume accommodating curve of the wheel circuit and a better exploitation of the pump characteristic are achieved.

3 Claims, 3 Drawing Sheets

BRAKE PRESSURE CONTROL APPARATUS

CROSS REFERENCE TO RELATED APPLICATION

This application is a continuation-in-part of U.S. Ser. No. 07/705,221, filed on May 24, 1991 now U.S. Pat. No. 5,176,432.

BACKGROUND OF THE INVENTION

This invention is related to a brake pressure control apparatus for automotive vehicles, with an anti-locking control system (ABS) and/or with a traction slip control system (TSS), which is operated by fluid pressure. Such apparatus includes a master cylinder, one or more wheel cylinders, each for a corresponding wheel brake, a pressure modulator for the modulation of the hydraulic pressure within the wheel cylinders during the brake pressure control mode, at least one motor-driven pump for the generation of a fluid pressure, and an electronic controller.

An example of brake systems of this type is described in published but unexamined German patent application No. 3,731,603.

Brake systems of this type are equipped with an anti-locking control system and/or with a traction slip control system. They are furnished with one or with two auxiliary pumps which deliver fluid under pressure into a pressure modulator during the anti-locking control mode to reincrease the pressure in the wheel cylinders in the anti-lock control mode.

The pressure modulator is comprised of a plurality of hydraulic valves. In particular, inlet and outlet valves are provided in said pressure modulator which are connected to the associated wheel cylinder.

The driver stage of the electronic controller pilots said inlet and outlet valves in accordance with the control algorithm which is installed in the controller. A pressure reduction phase is generated in the wheel cylinder when the outlet valve is open and the inlet valve is closed. When the inlet valve is closed and the outlet valve is open, a pressure stabilization phase comes about. When the inlet valve is open and the outlet valve is closed, a pressure rebuilding-up phase commences.

Furthermore, hydraulic circuits have been described in which the inlet valve has a restrictive effect. See the German patent application No. 3,919,842.1. in this respect.

In that patent application, a hydraulic brake system for a vehicle is described which is equipped with an anti-locking control system and which is comprised of a master cylinder, a fluid pressure accumulator, at least one wheel brake which is in communication with the master brake cylinder through a brake line and is in communication with the fluid pressure accumulator through a return line. An electromagnetically actuated outlet valve is inserted in the return line which shuts off the return line in its normal position and releases the return line in its switching position. A restriction valve is also incorporated in the brake line and which is furnished with two switching positions, in a first switching position, an unrestricted connection exists between the wheel brake and the master brake cylinder, and in a second switching position, a restricted connection exists between the wheel brake and the master brake cylinder.

A motor driven pump aspirates fluid from the accumulator and delivers it through a pressure line to the restriction valve. A sensor monitors the angular velocity of the wheel to be braked, and an electronic evaluation unit evaluates the sensor signal and generates switching signals for the pump drive and for the energization of the outlet valve.

It is proposed in the aforementioned German patent application that the restriction valve is connected by means of a control line to the outlet of the pump so that the pressure at said outlet of the pump shifts the restriction valve from the first into the second switching position.

In the system described in the German patent application no. P 3919842.1, a restrictor becomes effective in the inlet line going to the wheel cylinder during the control mode. In the course of the control mode, pressurized fluid is conveyed by the pumps into the wheel cylinder through the aforementioned restrictor. A pressure rebuild-up in the wheel cylinder comes about.

The pressure reduction is attained by the opening of an outlet valve. The outlet valves in question are constituted by electromagnetically actuatable valves, closed when de-energized (NC valves). According to the teachings of the state of the art, the NC valves are piloted by an output signal of the electronic controller included in the anti-locking control system.

SUMMARY OF THE INVENTION

According to the present invention, the wheel cylinder pressure is utilized so that the transmission of fluid into the wheel cylinder initially follows an orifice function but is changed over by increasing wheel cylinder pressure into a type of flow transmission which follows a flow limiting function.

In the inlet line going to the wheel cylinder, an inlet valve is provided which is configured and positioned in such a manner that during the pressure increase phase in the normal braking mode or during the pressure reincrease phase in the anti-locking control mode, upon the filling of the wheel cylinder, a flow limitation for the wheel cylinder takes place.

In the disclosed preferred embodiment, the inlet valve is comprised of a flow limiting valve assembly which becomes effective after a predetermined wheel cylinder pressure has been reached.

In particular, the inlet valve is comprised of an orifice through which the wheel cylinder is being filled and of a flow limiting valve assembly which becomes effective after a predetermined wheel cylinder pressure has been reached.

For the purpose of determining the change-over point on the curve of the orifice function which denotes the beginning of the flow limiting function, it is proposed that in addition to being subject to the action of a control spring, a control slide valve included in the flow limiting valve assembly is subjected to a prestressing force, preferably to the action of a prestressing spring.

The force of the prestressing spring is exerted by an auxiliary piston protruding into a wheel cylinder chamber defined in the valve, so that the prestressing spring is compressible by the wheel cylinder pressure exerted on the auxiliary piston in such a manner that the influence of the prestressing spring on the control slide valve is neutralized at a predetermined wheel cylinder pressure.

In the preferred embodiment, the control slide valve is configured as a control valve piston with a control edge, the piston separating a master cylinder pump pressure chamber, on one side, which chamber is in communication with the master cylinder, and with the delivery side of the pump, and the wheel cylinder pressure chamber on the other side, which chamber is in communication with the wheel cylinder. On one side, the piston is subjected to the action of the pressure within the master cylinder pump pressure chamber and, on the other side, is engaged by the auxiliary piston to be subjected to the opposing forces exerted by the prestressing spring, as well as a control spring acting directly on the primary piston, and the pressure within the wheel cylinder pressure chamber. Due to the rising pressure within the wheel cylinder pressure chamber, the control valve piston assumes an equilibrium position in which, with the aid of the control edge, a flow cross-sectional area in the line going to the wheel cylinder is controllably adjusted, causing a constant nominal flow rate to the wheel cylinder which is independent of any pressure increases within the master cylinder pump pressure chamber.

One alternative embodiment is based on the principle that in the inlet line going to the wheel cylinder, an inlet valve is provided which is configured and positioned in such a manner that during the pressure increase phase in the normal braking mode or during the pressure reincrease phase in the anti-locking control mode, upon the filling of the wheel cylinder, at least one separate orifice arranged downstream, preferably a sequence constituted by a plurality of orifices arranged downstream which influence the flow of fluid under pressure after the filling of the wheel cylinder, becomes effective in the inlet line going to the wheel cylinder.

Furthermore, in order to better fit the volume accommodating curve of the wheel circuit, in a second embodiment, in the inlet line going to the wheel cylinder an inlet valve is provided which is configured and positioned in such a manner that during the pressure increase phase in the normal braking mode or during the pressure reincrease phase in the anti-locking control mode, upon the filling of the wheel cylinder, at least one orifice is provided in the inlet valve arranged downstream, preferably a sequence constituted by a plurality of orifices arranged downstream, and also one or a plurality of flow limiting valve assemblies which influence the flow of pressure agent after the filling of the wheel cylinder become effective in the inlet line going to the wheel cylinder.

The invention has the following advantages:

A rapid filling of the wheel cylinder is achieved during the pressure increase in the normal braking mode as well as in the anti-locking control mode. In addition, an exactly defined pressure gradient during the pressure rebuilding-up phase in the control mode is attained.

In particular, the functions of a flow limiting valve are achieved by the invention and are utilized for a precise definition of the pressure gradient.

On the whole, a better adaptation to the volume accommodating curve of the wheel circuit is possible. Within the framework of the dimensioning of the flow limiting valve, an optimum exploitation of the pump characteristic is attained. The pedal feeling is improved.

A reduction of costs with regard to the set-up and to the manufacture of the described brake pressure control apparatuses is achieved.

The conventional prior art inlet valve consists of a solenoid valve, open when de-energized, which requires a sophisticated and expensive electric control system, numerous cables, a particular driver stage within the electronic controller, is replaced by a lower cost apparatus. The overall set-up of the brake pressure control apparatus according to the present invention is of a simpler design than the prior art apparatus.

DETAILED DESCRIPTION

Figure 2B:
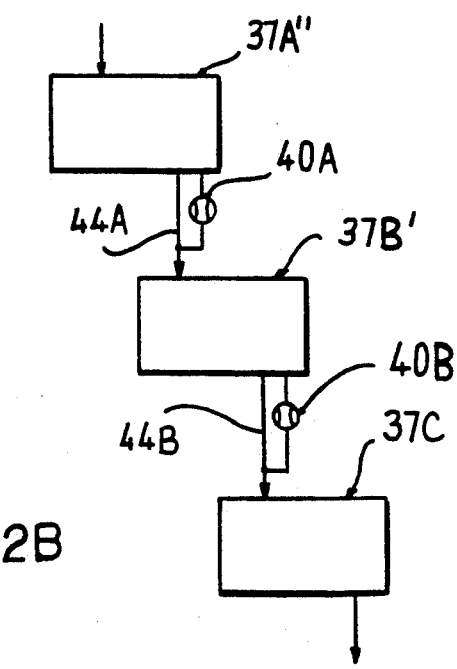
FIG. 2B is a diagram of a second embodiment of the invention.
Figure 2:
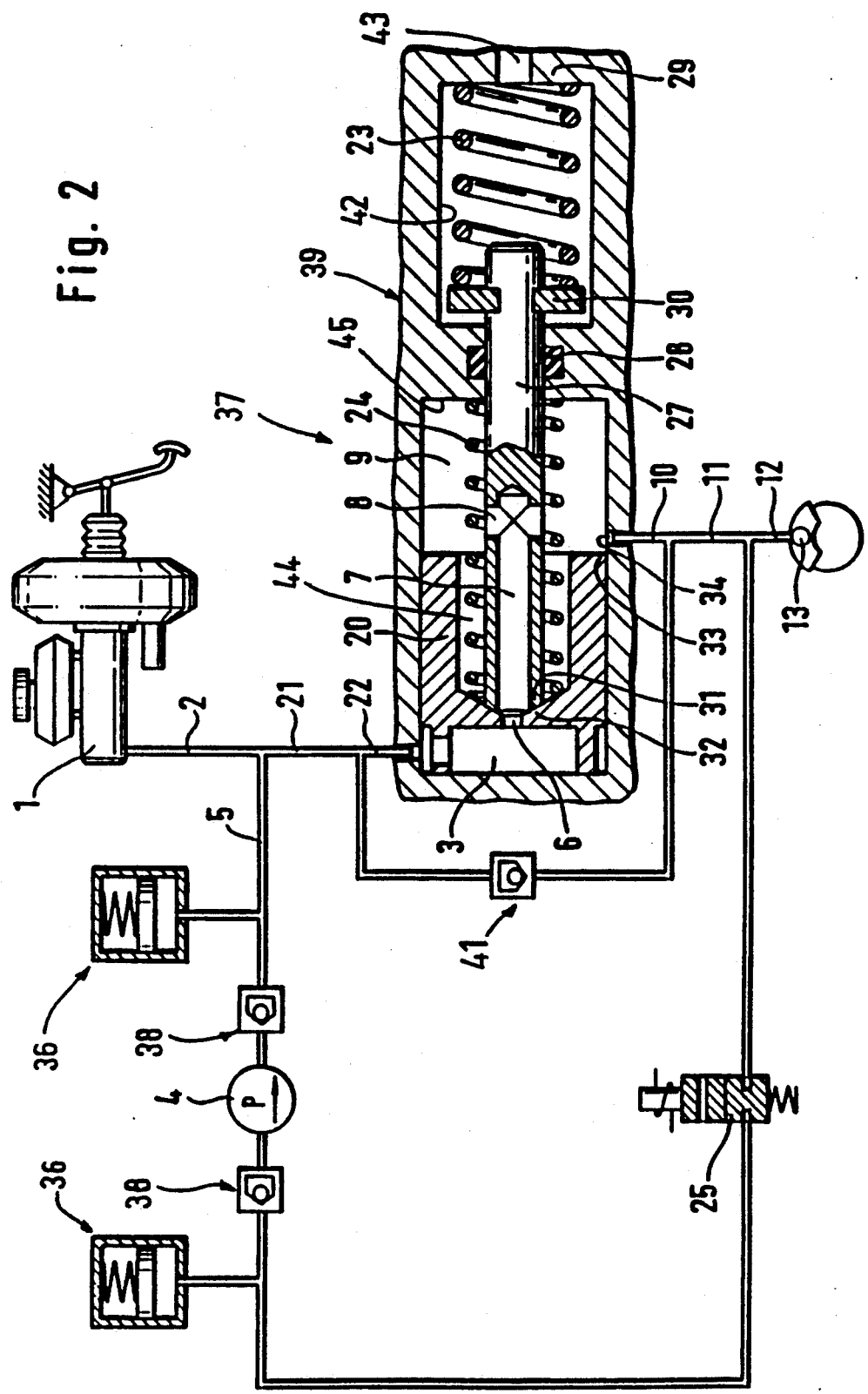
FIG. 2 is a hydraulic circuit diagram of the preferred embodiment of the invention.

Referring to the brake system represented diagrammatically in FIG. 2, in the normal braking mode, hydraulic fluid under pressure is conveyed by the brake pedal operated master cylinder 1 through the line 2 into the master cylinder pump pressure chamber 3.

In the anti-locking control mode, the pump 4 delivers hydraulic pressurizing through the lines 5, 21, 22 into a master cylinder-pump pressure chamber 3 defined on one side of a control valve piston in a valve housing 39 of an inlet valve 37 controlling communication of the pump 4 and master cylinder 1 with the wheel cylinder 13. The fluid pressure accumulators 36 described above are installed on the inlet and delivery side of the pump 4, with interposed check valves 38.

The pressurized hydraulic fluid is conveyed via the inlet valve 37 placed in communication with the master cylinder 1 and pump 4 by a fluid circuit including line 22, and also with the wheel cylinder 13 via lines 10, 11, 12 included in the fluid circuit.

The flow is directed through the cross-sectional area of an orifice 6 defined in a flow passage through a control valve piston 28 slidably mounted in a housing 39 of the inlet valve 37, through a central passage 7 of the auxiliary piston 27 aligned with the orifice 6, from there through the radial bores 8, into a wheel cylinder pressure chamber 9 defined in the valve housing 39 by the other side of the control valve piston 20.

From there, the pressurized hydraulic fluid is delivered out through control port 34 into the lines 10, 11, 12 to the wheel cylinder 13 associated with a vehicle brake.

The wheel cylinder 13 is thus filled with pressurized hydraulic fluid. As a result, the pressure will increase within the wheel cylinder 13 according to the section 14 of the curve in the diagram of FIG. 1.

Figure 1:
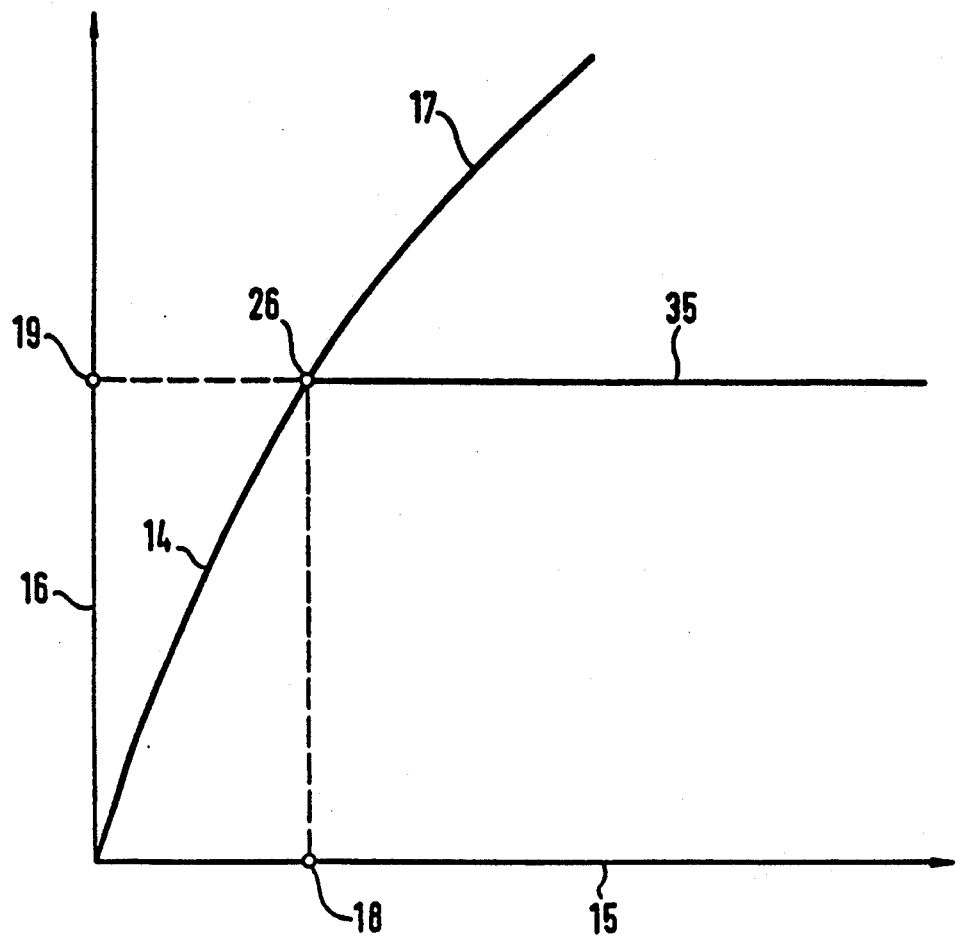
FIG. 1 is a plot of the volume conveyed into the wheel cylinder per unit of time versus the pressure differential acting across the inlet valve.

FIG. 1 shows a diagram on whose abscissa 15 the values denoting the differentials of the pressures within the master cylinder pump pressure chamber 3, on one hand, and within the wheel cylinder pressure chamber 9, on the other hand, are plotted. The ordinate 16 denotes the values of the flow volume which is conveyed into the wheel cylinder 13 per unit of time.

The section 14 of the curve described above is a part of the total curve 17 which graphically illustrates the orifice function. "Orifice function" means that the flow volume per unit of depends or upon or is proportioned to the differential pressure across the orifice. In this context this is the differential of the pressures within the master cylinder pump pressure chamber 3 and within the wheel cylinder pressure chamber 9.

When the pressure differential has reached the predetermined value 18, a flow limiting control will start. A constant volume per unit of time whose value is indicated by reference numeral 19 on the ordinate will be adjusted for the wheel cylinder by a flow limiting valve assembly which will be described in more detail below.

The described function operates both for the normal braking mode and for the pressure rebuilding-up phase during the control mode.

The master cylinder pressure will act on the control valve piston 20, in the normal mode and then the combined master cylinder pressure and the pressure of the pump 4 will be exerted thereon during the control mode, when the pump 4 is put into operation.

As has been explained above, the pump 4 delivers pressurized hydraulic fluid through the lines 5, 21, 22 into the master cylinder-pump pressure chamber 3.

The pressure within the master cylinder pump pressure chamber 3 acting on piston 20 is counteracted by the force collectively exerted thereon by a prestressing spring 23, à control spring 24, and the wheel cylinder pressure which builds up within the wheel cylinder pressure chamber 9. In the pressure rebuilding-up phase of the control mode the outlet valve 25 is in the closed condition.

As shown in FIG. 2, the prestressing spring 23 is accommodated within a bore 42 in the housing 39 which is vented at 43 to be of atmospheric pressure. The prestressing spring 23 is interposed between the bottom 29 of bore 42 in the housing 39 and a stop plate 30. The stop plate 30 is rigidly coupled to an auxiliary piston 27. Auxiliary piston 27 has its right end extending into the bore 42 containing the prestressing spring 23 with seal 28 preventing any escape of fluid from the wheel cylinder pressure chamber 9 by flowing past the piston 27. When the tapered left end 31 of the auxiliary piston 27 is engaged against the internal tapered bottom surface 32 of the control valve piston 20, the force of the prestressing spring 23, acting through the auxiliary piston 27, will likewise act on the piston 20, urging it to the left as viewed in FIG. 2.

The control spring 24 is interposed in between a housing endwall 45 defining in part the master cylinder pressure chamber 9 and the tapered bottom surface 32 of an internal bore 44 in the other side piston 20, so as to constantly urge the piston 20 to the left.

The differential pressure at the change-over point 26, (FIG. 1), depends on the force of the prestressing spring 23. By means of the prestressing spring 23, in addition to the control spring 24, the control valve piston 20, is maintained in its basic position.

Increasing wheel cylinder pressure slides the piston 20 to the right which thereby compresses the prestressing spring 23.

When the pressure within the wheel cylinder pressure chamber 9 has reached a pre-determined value, the auxiliary piston 27 and the stop plate 30 will be moved to the right by the pressure acting on the cross-sectional area of the piston 27. The auxiliary piston 27 will disengage from control valve piston 20, to negate the effect of prestressing spring 23 on the control slide valve piston 20 after the lefthand end 31 of the auxiliary piston 27 lifts off the internal bottom surface 32 of the internal bore in the control slide valve piston 20.

The control slide valve piston 20 will now be movable to the right under the influence of the fluid pressure in the master cylinder-pump pressure chamber 3 to be capable of performing a flow limiting function, in conjunction with the control spring 24, with the orifice 6, and with a control edge 33 defined by the right side of the piston 20.

Accordingly, increasing wheel cylinder pressure to a predetermined level cancels or neutralizes the effect of the prestressing spring 23, allowing rightward sliding movement of the control valve piston 20 so that the flow limiting control mode is initiated.

Due to the pressure within the master cylinder pump pressure chamber 3, the control valve piston 20 will be slid to the right, into an equilibrium position. As a result, the control edge 33 of said piston will enter the range of the cross-sectional area of the port 34 of the line 10 leading to the wheel cylinder 13. In the equilibrium position, the control edge 33 will establish a predetermined flow cross-sectional area which leads to a constant flow rate of the pressurized fluid (nominal flow rate) directed into the wheel cylinder 13. In the diagram the change-over point 26 is reached in this situation on the curve 17.

The nominal flow rate will not be affected by any further pressure increases within the master cylinder-pump pressure chamber 3. The desired nominal flow rate may be defined by a proper selection of design parameters. In this way, a precise definition of the pressure increase gradient is made possible.

In FIG. 1, the constant flow rate is represented by the straight line 35.

The described brake pressure control apparatus according to the present invention allows an adaptation to the volume accommodating curve of the wheel circuit which is better than that according to the state of the prior art.

A sequential arrangement of a plurality of orifices may be provided by the above-described inlet valve 37 instead of the flow limiting valve function.

Figure 2A:
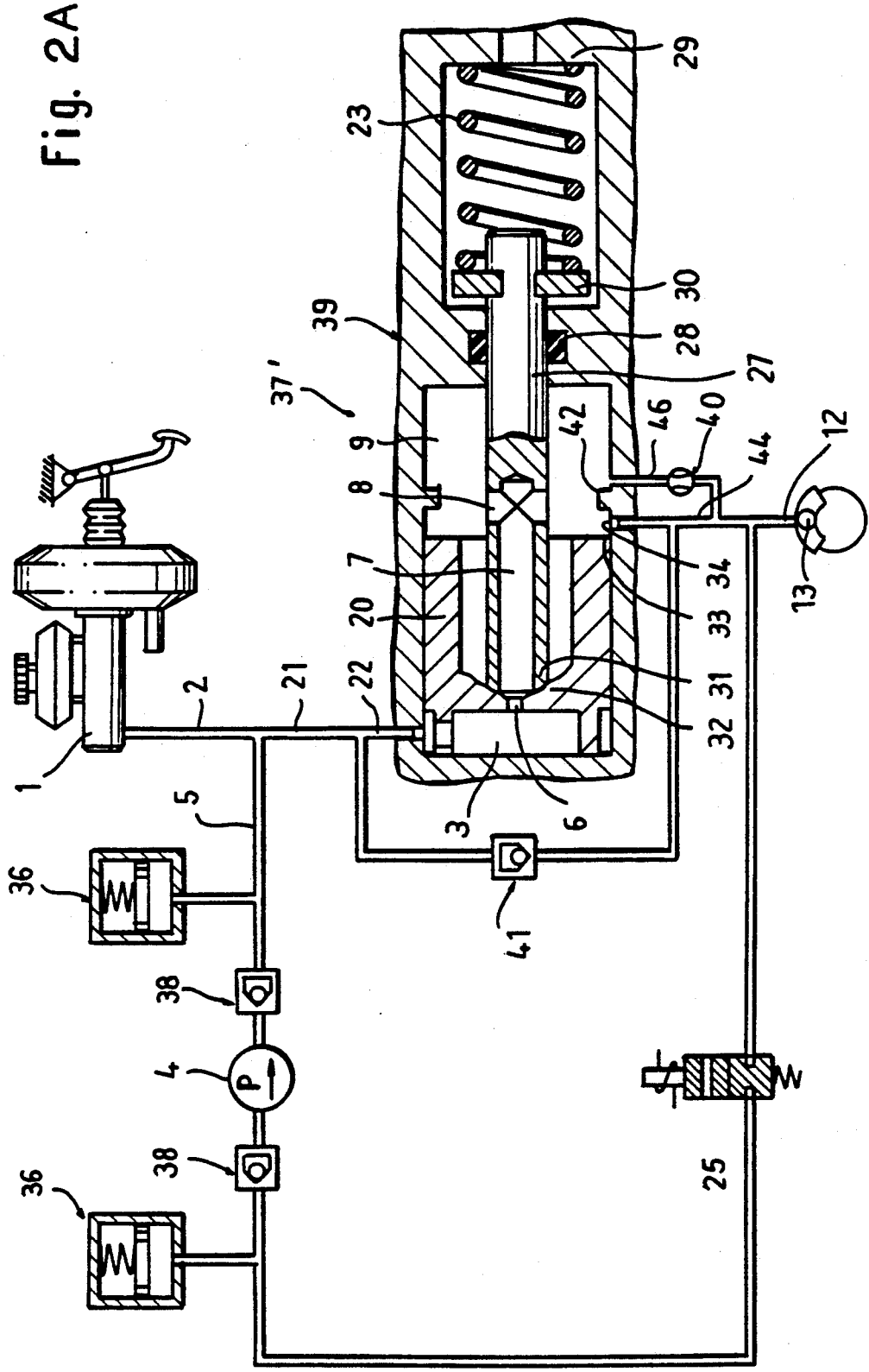
FIG. 2A is a fragmentary view of a modified version of the inlet valve and associated hydraulic circuit according to an alternate embodiment of the invention.

This is shown in FIG. 2A in which the port 34 is positioned adjacent to the edge of the piston 20 so as to be immediately covered upon disengagement of the auxiliary piston 27, and movement of the piston 20 against a stop shoulder 42. This closes shunt passage 44 and causes a second, downstream orifice 40 in an orifice passage 46 to become effective in controlling flow to the wheel cylinder 13.

FIG. 2B shows a cascade arrangement of a plurality of inlet valve 37"A, 37'B, 37C in which the shunt passage 44A, B and orifice passage 46A, B, are connected to the master cylinder pump chamber of the next downstream inlet valve 37'B, 37C which in effect provides a mixed combination of a successively effective plurality of orifices 40A, 40B and a flow limiting valve 37C or simply a plurality of orifices if flow limiting valve 37C is omitted, so that better shaping of the flow curve to the wheel cylinder 13 is able to be achieved.

Various and differing characteristics of the orifices 6, 40, 40A, 40B and flow limiting valve 37C can of course be employed to achieve this end.

During the pressure reduction phase within the frame-work of the control mode, the outlet valve 25 will be opened. This will lead to a pressure reduction within the wheel cylinder 13. A one way check valve 41 also allows a rapid pressure reduction in wheel cylinder 13 after pressure ceases to be applied by the master cylinder 1 and/or pump 4.

The described embodiment shows a so-called "closed" system in which the suction side of the pump is hydraulically connected to the outlet valve without a fluid reservoir which is open to the atmosphere being arranged in between. Basically, the invention, in particular the embodiment described, may as well be employed for "open" systems. These are systems which are comprised of a fluid reservoir which is open to the atmosphere.

We claim:

1. A brake fluid pressure control apparatus for an automotive wheel brake including a wheel cylinder for operating said wheel brake, a brake pedal actuated master cylinder and a pump, each of said master cylinder and said pump having an outlet operable to pressurize fluid to operate said wheel cylinder, fluid circuit means establishing communication between said outlet of said master cylinder and pump and said wheel cylinder, said brake fluid pressure control apparatus comprising:

inlet valve means interposed in said fluid circuit means to control fluid communication between said master cylinder and pump and said wheel cylinder, said inlet valve means including a valve housing, a first bore in said housing, a control valve piston slidably mounted in said bore, said control valve piston and said valve housing defining on one side of said piston a master cylinder-pump chamber, said master cylinder-pump chamber connected by said fluid circuit means to said outlet of said master cylinder and pump to be pressurized thereby; another side of said control valve piston and said valve housing defining on the other side of said piston a wheel cylinder chamber, said wheel cylinder chamber connected by said fluid circuit means to said wheel cylinder, a flow passage connecting said master cylinder-pump chamber to said wheel cylinder chamber having a first orifice therein establishing fluid flow between said chambers at a rate proportioned to the pressure differential therebetween;

an auxiliary piston slidably mounted in said valve housing having one end protruding into said wheel cylinder chamber to be subjected to the pressure therein only on said one end, and a compressible prestressing spring developing a force acting on another end of said auxiliary piston to urge said auxiliary piston into engagement with said another side of said control valve piston and thereby exert said force of said prestressing spring on said control valve piston;

a control spring acting directly on said control valve piston to resist movement of said control valve piston toward said wheel cylinder chamber;

a control port formed in said valve housing connecting said wheel cylinder chamber with said wheel cylinder, said control port located adjacent said other side of said control valve piston so as to be covered upon advance of said control valve piston towards said wheel cylinder chamber;

said force of said prestressing spring neutralized upon development of a predetermined fluid pressure in said wheel cylinder chamber to allow said advance of said control valve piston completely over said control port;

a shunt passage connecting said control port to said wheel cylinder; and an orifice passage constantly connected to said wheel cylinder chamber and said wheel cylinder in parallel with said shunt passage, and an orifice in said orifice passage restricting flow thereto upon covering of said control port when said force of said prestressing spring is neutralized.

2. The brake fluid pressure control apparatus according to claim 1 further including in combination another inlet valve means interposed in said fluid circuit means to control fluid communication between said master cylinder and pump and said wheel cylinder, said another inlet valve means including a valve housing, a first bore in said housing, a control valve piston slidably mounted in said bore, said control valve piston and said valve housing defining on one side of said piston a master cylinder-pump chamber, said master cylinder-pump chamber of said another inlet valve means connected by said fluid circuit means to said shunt and orifice passage of said first recited inlet valve means to be pressurized thereby; and other side of said control valve piston and said valve housing defining on the other side of said control valve piston a wheel cylinder chamber, said wheel cylinder chamber of said another inlet valve means connected by said fluid circuit means to said wheel cylinder, a flow passage connecting said master cylinder-pump chamber to said wheel cylinder chamber of said master inlet valve means having an orifice therein establishing fluid flow between said chambers at a rate proportioned to the pressure differential therebetween;

said another inlet valve means also having an auxiliary piston slidably mounted in said valve housing having one end protruding into said wheel cylinder chamber to be subjected to the pressure therein only on said one end, and a compressible prestressing spring developing a force acting on another end of said auxiliary piston to urge said auxiliary piston into engagement with said another side of said control valve piston and thereby exert said force of said prestressing spring on said control valve piston;

said another inlet valve means further having a control spring acting directly on said control valve piston of said another inlet valve means to resist movement of said control valve of said another inlet valve means piston toward said wheel cylinder chamber of said another inlet valve means;

a control port formed in said valve housing of said another inlet valve means connecting said wheel cylinder chamber of said another inlet valve means with said wheel cylinder, said control port located adjacent said other side of said control valve piston so as to be partially covered upon advance of said control valve piston towards said wheel cylinder chamber;

a shunt passage connecting said control port of said another inlet valve means with said wheel cylinder;

another inlet valve means orifice passage constantly connected to said wheel cylinder chamber of said another inlet valve means; and an orifice in said another orifice passage, said orifices in said respective orifice passage receiving flow in series upon closing of said control port of each of said first recited and another inlet valve means.

3. The brake fluid pressure control apparatus according to claim 1 further including in combination:

another inlet valve means interposed in said fluid circuit means to control fluid communication between said master cylinder and pump and said wheel cylinder, said another inlet valve means including a valve housing, a first bore in said housing, a control valve piston slidably mounted in said bore, said control valve piston and said valve housing defining on one side of said piston a master cylinder-pump chamber, said master cylinder-pump chamber of said another inlet valve means connected by said fluid circuit means to said shunt and orifice passage of said first recited inlet valve means to be pressurized thereby; another side of said control valve piston and said valve housing defining on the other side of said control valve piston a wheel cylinder chamber, said wheel cylinder chamber of said another inlet valve means connected by said fluid circuit means to said wheel cylinder, a flow passage connecting said master cylinder-pump chamber to said wheel cylinder chamber having an orifice therein establishing fluid flow between said chambers at a rate proportioned to the pressure differential therebetween;

said another inlet valve means also having an auxiliary piston slidably mounted in said valve housing having one end protruding into said wheel cylinder chamber to be subjected to the pressure therein only on said one end, and a compressible prestressing spring developing a force acting on another end of said auxiliary piston to urge said auxiliary piston into engagement with said another side of said control valve piston and thereby exert said force of said prestressing spring on said control valve piston;

said another inlet valve means further having a control spring acting directly on said control valve piston of said another inlet valve means to resist movement of said control valve of said another inlet valve means piston toward said wheel cylinder chamber of said another inlet valve means;

a control port formed in said valve housing of said another inlet valve means connecting said wheel cylinder chamber of said another inlet valve means with said wheel cylinder, said control port located adjacent said other side of said control valve piston so as to be partially covered upon advance of said control valve piston towards said wheel cylinder chamber of said another inlet valve means;

said force of said prestressing spring of said another inlet valve means neutralized upon development of a predetermined fluid pressure in said wheel cylinder chamber of said another inlet valve means to allow said advance of said control valve piston of said another inlet valve means over said control port of said another inlet valve means;

said control port of said another inlet valve means constituting the only outlet from said master cylinder chamber of said another inlet valve means so that a constant pressure metering action is produced by said control valve piston of said another inlet valve means, said prestressing spring of said another inlet valve means and said control port of said another inlet valve means.

* * * * *